Oct. 6, 1953     R. A. MUELLER ET AL     2,654,563
VALVE WITH REMOVABLE SEAT
Filed Oct. 30, 1947     3 Sheets-Sheet 1
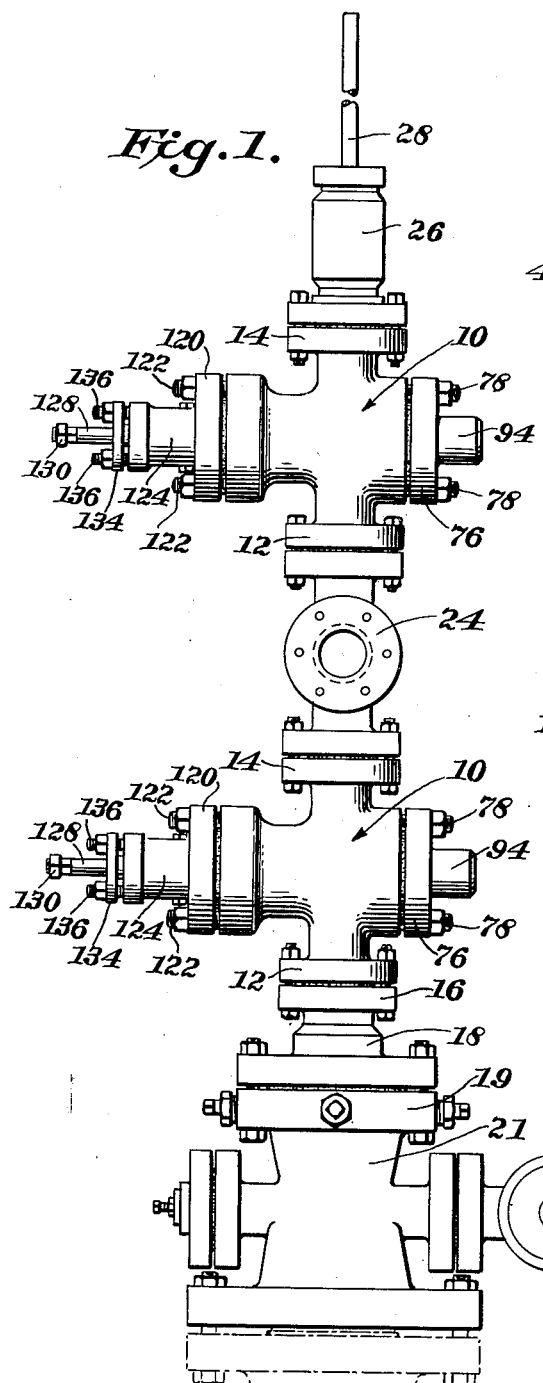
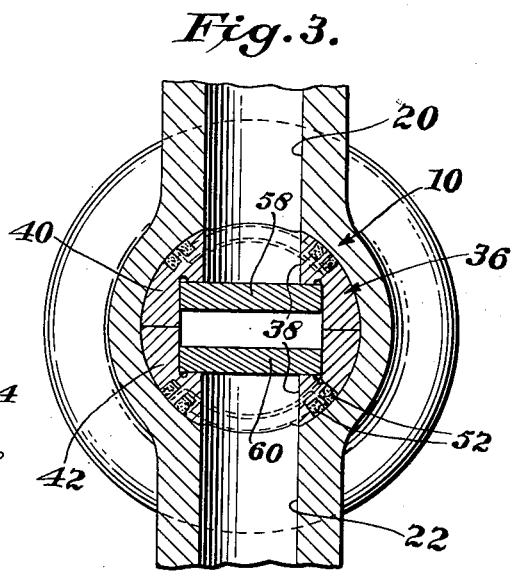
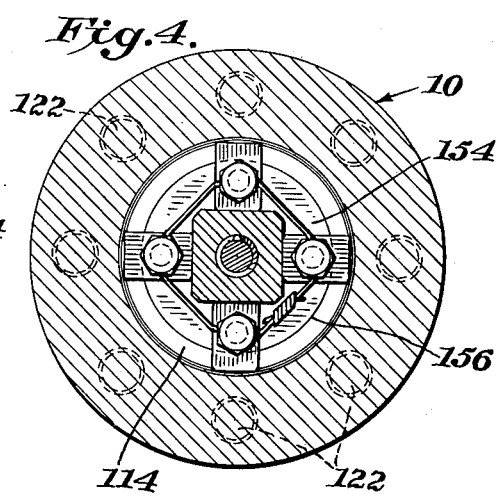
Inventors:
Robert H. Mueller,
Robert L. Crain,
By Cushman, Darby & Cushman
Attorneys

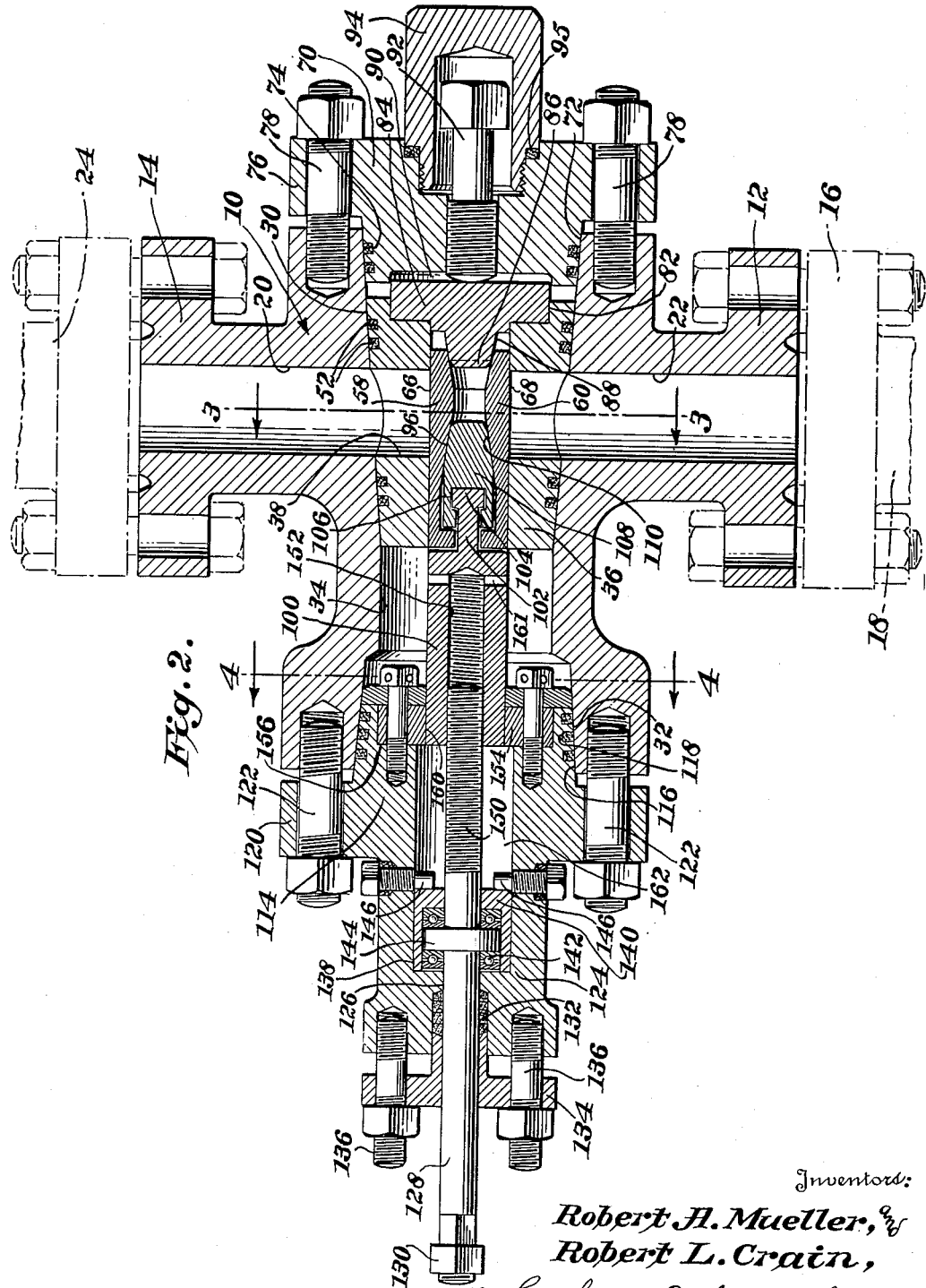

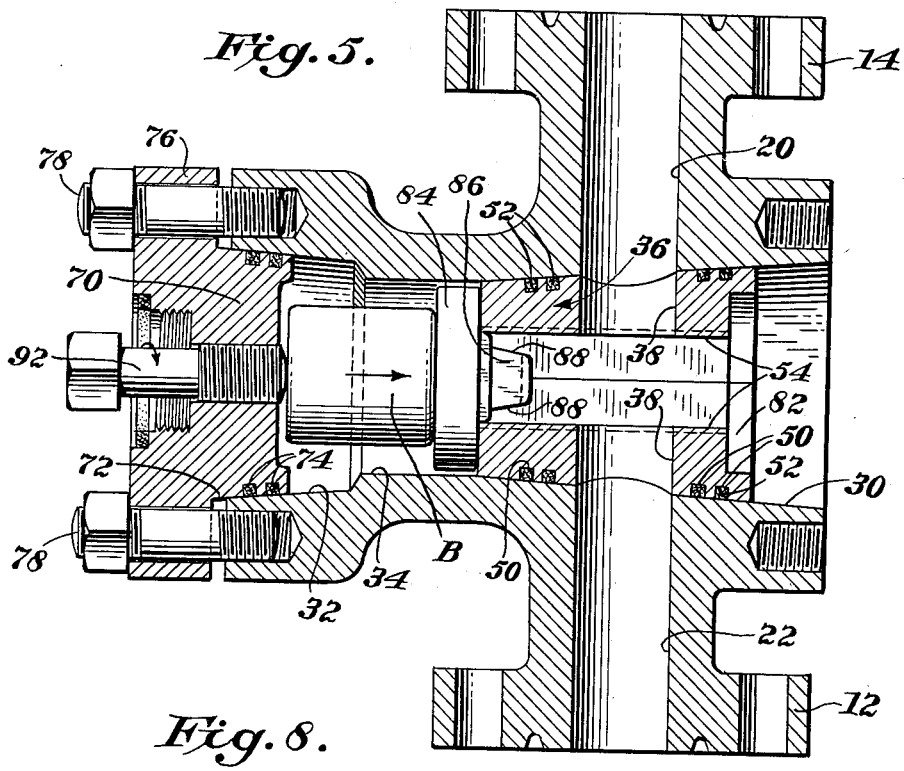
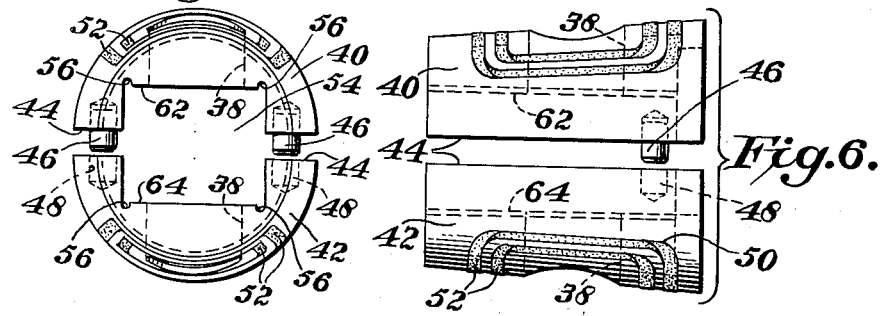
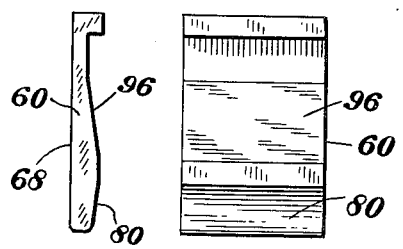
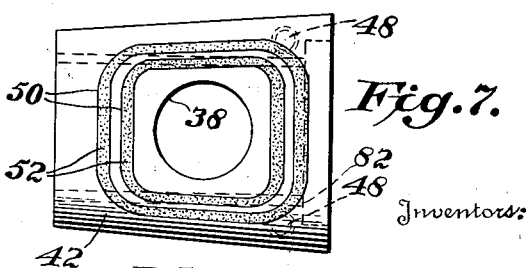

Patented Oct. 6, 1953

2,654,563

UNITED STATES PATENT OFFICE 2,654,563

VALVE WITH REMOVABLE SEAT

Robert A. Mueller and Robert L. Crain, Houston, Tex., assignors to Gray Tool Company, Houston, Tex., a corporation of Texas Application October 30, 1947, Serial No. 783,107

6 Claims. (Cl. 251—62)

The present invention relates to a gate valve which is particularly useful in high pressure fluid conduits, the design of said valve adapting it for use immediately associated with an oil well as the master flow control manifold valve of the Christmas tree of the well. However, the gate valve of the invention will be found to be of general utility, other than in the particular association emphasized herein.

A principal object of the invention is to provide such a valve which may be used for a long period of time, by reason of the fact that the parts thereof which are subject to the greatest wear may be replaced when they become worn, without scrapping the entire valve, and if found to be convenient, without removing the valve from the Christmas tree assembly in which it is mounted. The invention accomplishes this purpose by providing a design wherein the working parts of the valve may be removed from the valve body as a unit, an important feature of the design being the maintaining of a full opening through the valve passage whereby tools necessary for effecting a seal in the flow line on the high pressure side of the valve can be passed through the valve passage at all times. It will be understood that in the art of oil wells, it is often necessary to pass various tools through control valves, and due to the necessity to utilize all available space within any oil well conduit, it is essential that the design of a valve to obtain a given advantage, should not, in any way, encroach on the available space to work with tools through the valve.

In the valve of the present invention, provision is made for removing the valve seat from the valve body without removing the valve from its position on the well, it being understood that valve seats in high pressure oil well lines are subjected to serious wear due to the abrading action of fluid and sand which passes at great velocity through the valve.

Ancillary to the preceding objective, it is a purpose of the invention to provide a valve having a seat and associated parts which may be removed and replaced with rapidity and convenience, it being understood that in this particular environment of high pressure oil wells, all repair operations must be capable of rapid performance in order to reduce the hazard of the well getting out of control.

The particular use of the valve of this invention will be apparent by reference to Patent 2,148,327—Smith et al.—February 21, 1939, and 2,241,288—Yancey—May 6, 1941. These patents disclose apparatus for completing and flowing wells including master manifold valves 120 (Figure 7) in the case of Patent 2,148,327 and 64 (Figure 4) of Patent 2,241,288 which are positioned on the tubing head at a time when control through the tubing is maintained by a removable back pressure valve in a special collar. The valve of the present invention would be particularly useful as a substitute for the said master manifold valves referred to, and shown in these patents.

In line with the convenience and rapidity of repair referred to above, it is an object of the invention to provide a valve having a removable seat of plug-like construction which does not require the use of tools of special adaptation in order to effect its removal, the removal operation being accomplished with the aid of certain removable parts of the valve itself, as described in detail below.

While the valve of this invention is not confined in its usefulness to any particular operations therethrough, the earlier patents referred to describe certain necessary operations through such a valve, which will serve to emphasize the utility of the valve of the present invention. Particularly, the present valve will be found to be of great usefulness in a manifold assembly mounted on a high pressure and dangerous conduit, such as that extending from an oil well, it being obvious that there is great advantage in being able to repair the parts of such an assembly without breaking the assembly down and removing it from its position on the well. With the present valve mounted on a well in the position shown in said patents, a back pressure valve can be inserted into the tubing by a polish rod passed through a stuffing box mounted above the valve, while maintaining the well under control at all times. With the back pressure valve properly located below a master manifold valve of the present invention, the removable seat of this valve may be taken out in a manner hereinafter described and replaced with a new seat, without breaking down the manifold assembly on the well. It will be understood that not only the valve seat, but the valve member itself, may be removed and replaced, in the manner hereinafter described.

A notable accomplishment of the invention resides in the saving of materials, as heretofore it has been necessary to replace the entire valve when the seat portions thereof become worn, or to connect an additional valve into the manifold on the low pressure side of a valve which has begun to exhibit signs of leakage.

A number of other objects and advantages of the invention will be apparent as the description herein progresses.

In the drawings:

Figure 1 is a side elevational view of a manifold assembly mounted on an oil well, commonly known as the Christmas tree, showing valves of the present invention associated as parts of this assembly. The view is similar to Figure 4 of Patent 2,241,288, except that it is not in section, Figure 2 is an enlarged central sectional view through the valve assembly of the invention, the section being vertical with respect to the position which the valve is commonly mounted as in Figure 1, Figures 3 and 4 are sectional views taken, respectively, along the lines 3—3 and 4—4 of Figure 2, Figure 5 is a view similar to Figure 2, but showing the equipment in condition when the valve member has been removed, and at the time parts of the assembly are being used to dislodge the valve seat plug, Figure 6 is a side elevational view of the two parts of the valve seat plug, illustrating the manner in which they are assembled with respect to one another, Figure 7 is a side elevational view of the valve seat plug, looking inwardly toward the passage therethrough and illustrating the closed packing rings on the tapered surface thereof around said passage, Figure 8 is an end view of the two parts of the valve seat plug, looking inwardly from the left of Figure 6, Figure 9 is a side view of one of the opposite sections of the valve member, and Figure 10 is a face view of one of the opposite sections of the valve member, looking inwardly from the right of Figure 9.

Referring to Figure 1, the valve comprises a body 10 having at its opposite ends attachment means comprising flanges 12 and 14, whereby the valve may be connected in a high pressure manifold assembly as shown in Figure 1. While the valve is symmetrical and may be inverted from the position shown, when installed as illustrated in Figure 2, the flange 12 is at the high pressure or upstream side of the valve member, whereas the flange 14 is at the low pressure or downstream side of the valve member. As shown in Figure 1, the valve is attached on the flange 16 of an adapter 18 which, in turn, is secured to the flange 19 of the tubing head 21, although the valve may be designed for direct attachment to said tubing head as illustrated in Patent 2,148,327.

Turning again to Figure 2, the body of the valve is provided with a straight vertical passage therethrough, said passage comprising an outer part 20 and an inner part 22 which are interrupted by the bore for the valve seat plug as hereinafter described. Referring to Figure 1, it is through this passage of the valve that operations of the type referred to are performed, and when the tubing back pressure valve as described in said patents, is removed, the valve may be used to control the flow of oil from the well. In Figure 1, a cross fitting 24 is shown mounted above the lower valve 10, and various flow lines having chokes and other flow control appurtenances therein, may be attached to the cross 24, or composite flow assemblies as are well known in the art may be mounted directly above the lower valve 10 as illustrated in Figure 1, the cross 24 being used merely for purpose of illustration. A pair of the valves 10 are shown in Figure 1, but it will be understood that in many installations, only one such valve is employed. The stuffing box 26 and the polish rod 28 shown in Figure 1 are likewise only for purposes of illustration, merely to suggest the performance of the particular operation referred to in the earlier patents mentioned herein.

Again referring to Figure 2, the valve body is provided with a bore extending laterally therethrough. This bore comprises an inwardly conical tapered portion 30, extending from one side of the body across and beyond the flow passage therethrough, and a continuing outwardly tapered portion 32 at the opposite side of the valve. There may be an intermediate cylindrical portion of said bore, as shown at 34.

In the portion 30 of said bore, a valve seat plug 36 is removably mounted. This valve seat plug is exteriorly formed to the conical taper of the bore 30, and it has a passage 38 extending laterally therethrough, said passage being adapted to be aligned with the passages 20 and 22 and being of the same diameter as said passages.

While the valve seat plug 36 may be made in one piece, we have found it convenient to make it in two symmetrical half parts 40 and 42 as shown in Figures 6 and 7, these half portions fitting against one another along their central evenly machined faces 44. In order that the half parts may be accurately aligned with one another, one half part may be provided with opposite extending lugs 46 which are adapted to enter aligned grooves 48 in the companion valve seat part. Disposed around the passage 38 through the valve seat plug are continuous generally rectangular grooves 50 in the opposite tapered faces of the valve seat plug. There may be one or more of these grooves, and in each of said grooves there is a ring of compressible packing material 52 which may extend somewhat beyond the outer face of the valve seat plug, whereby it is compressed when said plug is inserted into its seated position as shown in Figure 2, in order to provide a tight seal around the passage through the valve. It will be understood that by reason of the cooperating tapered form of the bore and the valve seat plug, the seal provided by the rings 52 will be tight enough to resist the high pressures which are being controlled.

Extending longitudinally through the center of the valve seat plug is a generally rectangular opening 54, as indicated in Figure 8, a half part of said opening being cut from each of the valve seat halves as shown. This opening may be provided with longitudinal corner grooves 56 if desired, for purposes of lubrication.

As shown in Figures 2 and 3, there is a valve member mounted for sliding movement longitudinally of the valve seat member and laterally of the passage therethrough, said valve member comprising opposite sections 58 and 60. It will be understood, that by means hereinafter described, the valve member is moved laterally across the fluid passage to open and close the latter, provision being made to expand the valve member sections outwardly toward their respective valve seats to insure a tight closure when the valve is fully seated. In this connection, the opening 54 through the valve seat plug provides opposite valve seat faces 62 and 64, surrounding the passage through the plug, said faces being accurately machined or surfaced to provide a tight metal to metal seal respectively with similar outer faces 66 and 68 on the sections of the valve member.

The outer end of the conical portion 30 of the bore through the body is closed by a first sealing plug 70, as shown in Figure 2, said plug having an inwardly tapered portion 72 of conical form designed to seal in the outer end of said bore, and there are one or more circular grooves 74 with packing therein, to seal said plug in said bore in a manner similar to the seal afforded by the packing in the grooves in the valve seat plug 36. The outer end of the first sealing plug 70 is provided with a circular flange 76, which is adapted to be attached by the bolts 78 in order to lock the sealing plug in position, as hereinafter described, and to close the outer end of the bore through the body against the high pressure being controlled.

It will be observed in Figure 9 that the inner face of each of the valve member sections is provided with a sloping cam surface 80 near the forward end thereof, for the purpose of expanding the valve member when it reaches its fully closed position. As indicated in Figure 2, the larger or outer end of the valve seat plug 36 is provided with a circular well 82 to receive the flange 84 of a valve member expanding element which has an inwardly directed wedge member 86, said wedge member having opposite cam surfaces 88 which bear against the cam surfaces 80 on the valve member sections to expand the same at their forward ends outwardly with respect to one another so that the surfaces 68 of said valve member sections will tightly engage the valve seats 62 and 64 at the forward end of the valve member. The inner face of the first sealing plug member 70 is provided with a depression 90 in alignment with the well 82 in the outer end of the valve seat plug, to permit the final adjustment of the pressure of the valve seat plug 36 against said bore as hereinafter described. Adjustment of the wedge 86 in order to press the valve seat plug into said bore is provided by an adjusting screw 92 threaded through the first sealing plug 70 and having an inner rounded end to bear against the outer face of the flange 84 of the wedge member. The bolt 92 may be protected by a cap 94 threaded into the outer end of the first sealing plug 70 and provided with appropriate packing at 95 as shown, to complete a pressure tight seal around the bolt 92.

Referring again to Figures 9 and 10, it will be observed that the inner faces of the valve member sections are provided with additional cam surfaces 96 sloping toward the rearward end of the valve member, the slope of these cam surfaces being somewhat more gradual than that of the forward surfaces 80.

Motion is imparted to the valve member by a polygonal rising nut 100. At its inner end, this nut has a central extension 102 which carries a substantially rectangular head 104, said head fitting in a corresponding slot 106 in a second wedge member 108 carried by and for movement with the nut 100, the wedge member 108 having sloping cam surfaces 110 which correspond with the cam surfaces 96 on the inner faces of the valve member sections.

It will be apparent from the above that when the rising nut 100 is moved to the right as viewed in Figure 2, the valve member will be carried across the passage until its surfaces 80 engage the fixed wedge member 86, whereupon further inward movement of the valve member will cause it to be expanded by said fixed wedge member into tight engagement with the valve seats 62 and 64, adjacent the forward end of the valve member. Simultaneous with the expansion action just described, the moving wedge member 108 will expand the valve member sections outwardly into tight engagement with the opposite valve seats, adjacent the rearward end of the valve member.

When the rising nut 100 is moved to the left to open the valve, there will be an initial relieving action near the rearward end of the valve member by movement of the wedge 108 with respect to the surfaces 96 on the valve member sections, it being apparent from Figure 2 that the wedge 108 is somewhat loosely mounted within the valve member so that there will be a permissible lost motion movement to initially loosen the valve member from its seat before it is laterally pulled to the left as viewed in Figure 2. Upon the commencement of such lateral movement of the valve member toward its open position, the latter will be withdrawn from the fixed wedge member 86 so that the forward end of the valve member can collapse just before or at the time its movement toward open position is initiated.

The mechanism for translating the rising nut 100 in order to open and close the valve is carried by a second sealing plug 114 having an inner tapered surface 116 which is of such form to seal in the tapered portion 32 of the valve body bore at the end opposite to that through which the valve seat plug is inserted. The tapered portion 116 of the second sealing plug may be provided with one or more circular grooves 118, with packing therein, as previously described. The second sealing plug is similarly provided with a flange 120, and with bolts 122, whereby it may be tightened in sealing relation in the outer end of the bore through the body.

Extending outwardly from the second sealing plug 114 is an integral head 124, having a central bore 126 therethrough, and passing through this bore is a cylindrical valve stem 128 having a nut or other means 130 at its outer end to attach an operating wheel. The valve stem is packed in the head 124 by a stuffing box 132 which is tightened by a gland 134 by means of bolts 136 threaded into the outer end of said head.

The head 124 also has a central inside cavity 138 which carries an outwardly presented cup member 140, and in said cup member there is conventional ball bearing means 142 to support and absorb the thrust of a thrust collar 144 which is integral with the valve stem 128. The cup 140 is held in place in the outer end of the bore 138 by bolts 146 which may be threaded and pressure packed in the head 124.

The inner end of the valve stem 128 is threaded as at 150, and these threads mesh with a threaded bore 152 extending inwardly through the rising nut 100. A ring 154 is bolted into a cavity 156 in the inner face of the second sealing plug 114 as shown, this ring having a polygonal opening 160 therethrough of such shape as to fit the polygonal exterior of the rising nut 100. Drilled holes 161 may be provided in the nut 100 to lubricate the interior threads thereof.

It will be apparent that the various working parts of the valve member may be lubricated by the oil which flows through the valve passage, said oil being confined by the first and second sealing plugs as described.

It will be apparent from the above that when the valve stem 128 is turned, as by a wheel or other suitable tool for the purpose, the turning of the thread 150 on the inner end of said stem will cause the rising nut to be translated laterally with respect to the passage through the valve body, the nut 100 being restrained against turning movement by reason of its polygonal exterior fitting within the corresponding polygonal opening in the fixed ring 154. It will further be apparent that the open chamber 152 in the second sealing plug 114 is of such length with respect to that of the other parts described, that the valve member can be withdrawn outwardly to entirely clear the passage through the valve. It is further obvious that the valve member expanding wedge 86 is of such design that it does not extend into said passage, whereby a full bore through the valve is available for the passage of tools therethrough when the valve is in its open condition.

The taper at opposite ends of the bore through the valve body is identical in size and slope, whereby the first valve plug 70 may be used in dislodging the valve seat plug 36 when it is desired to remove same. Referring to Figure 5, it will be observed that the first valve plug 70 has been removed from the tapered portion 30 of the bore, and the second valve plug 114, with its associated parts including the valve member and its operating means, has likewise been removed. It will be understood that with the valve mounted in a manifold assembly on the well, these operations will have been accomplished after a removable back pressure valve has been passed inwardly through the valve and fixed in position to control against upward flow through the tubing, as described in the prior patents previously referred to. To facilitate dislodging the valve seat plug, the wedge member 86 may be inserted into the opposite end of the opening through the valve seat plug, as shown in Figure 5, and any form of plug B of proper length may be positioned against the flange 84 of said wedge member. Thereafter, the first sealing plug 70 is positioned in the bore 32 as shown, and the bolt 92 may be used as a jack to force the valve seat plug outwardly through the portion 30 of the bore in the valve body.

It will be obvious that the construction shown herein may be changed in various ways in the practice of the invention. For example, while I have found it convenient to manufacture and assemble the valve seat plug in two parts, it may be made in only one part if desired, with a central opening therethrough to guide the sliding movements of the valve member. The valve seat plug and the first sealing plug 70 may be considered as a single assembly, as far as the operation of the valve is concerned, but we have formed this assembly in separate parts in order that the sealing plug 70 may perform the additional function of aiding in dislodging the valve seat plug in the manner described above. The means for separating the valve member is susceptible to considerable variation, but I prefer to mount said means in the second sealing plug 114 or its equivalent, whereby the valve operating mechanism comprises an assembly which may be removed as a unit but which forms a tight seal in the body when it is inserted. While a laterally movable valve member is disclosed, mounted in the valve seat plug, it will be understood that a removable valve seat arrangement could be provided wherein the valve member operates on any other well known principle. For example, the valve member might be of a conventional rotary plug type.

It will be noted that the sealing rings 52 are mounted in the outer wall of the valve seat plug, which is of great mass and rigidity, whereby said valve seat plug may be tightly wedged in said bore to form a seal with said rings, without the possibility of the stress applied to the valve seat plug in any way changing the position or condition of its valve seats 62 and 64. By reason of this construction, binding of the valve member against its seat is precluded. It will further be observed that the packing rings 52 are on a part of the assembly which can be removed, whereby said rings may be conveniently replaced. These rings are most effective in their sealing action, as they are mounted on the tapered portion of the valve seat plug which is tightly wedged in place by the action of the bolt 92. The position of the bolt 92 centrally with respect to the valve seat plug insures that an even pressure may be applied to the valve seat plug after the first sealing plug 70 has been applied, and after the bolts 78 have been tightened. It is obvious that the action of the valve member in its movement toward its seat cannot tend to dislodge the valve seat member from said bore, for the force of the valve seat member is received by the bolt 92 which is mounted in the first sealing plug 70 which is, in turn, bolted to the body.

We claim:

1. A valve assembly for use on a high pressure fluid line comprising a body having means at opposite ends for attachment in said line, said body having a straight passage extending therethrough between said attachment means, said body having a bore extending laterally of and interrupting said passage, said bore tapering inwardly from one end at one side of said body to a point beyond said passage and thence flaring outwardly at its other end on the opposite side of said body, a removable valve seat assembly comprising a tapered valve seat plug inserted to seating position in said bore through said one end thereof, said plug having a passage extending therethrough as large as and adapted to be aligned with the passage through said body and having annular sealing rings thereon which completely surround the opposite ends of said plug passage, said valve seat plug having a bore therein extending from its forward end across the passage therethrough, a valve member removably mounted and for movement in said bore of said valve seat plug to open and close said passage, a first tapered sealing plug removably mounted in the outer part of said bore at said one side of said body having an adjustable member for applying pressure to said valve seat plug to lodge it in said bore, a second tapered sealing plug secured in said other end of said bore, packing rings extending around said first and second sealing plugs to seal them in said bore, and actuating means carried by said last named plug and connected with said valve member to move the latter between closed and open positions.

2. A valve assembly for use on a high pressure fluid line comprising a body having means at opposite ends for attachment in said line, said body having a straight passage extending therethrough between said attachment means, said body having a bore extending laterally of and interrupting said passage, said bore tapering inwardly from one end at one side of said body to a point beyond said passage and thence flaring outwardly at its other end on the opposite side of said body, a removable valve seat assembly comprising a tapered valve seat plug inserted to seating position in said bore through said one end thereof, said plug having a passage extending therethrough as large as and adapted to be aligned with the passage through said body, said valve seat plug having a bore therein extending from its forward end across the passage therethrough, a valve member removably mounted and for movement in said bore of said valve seat plug to open and close said passage, a first tapered sealing plug removably mounted in the outer part of said bore at said one side of said body having an adjustable member for applying pressure to said valve seat plug to lodge it in said bore, a second tapered sealing plug secured in the outer part of said bore at the opposite end of said body having actuating means connected with said valve member to move the latter between closed and open positions, the taper of said bore at its opposite ends and the taper and size of said first and second sealing plugs being the same, whereby said first sealing plug may be substituted for said second sealing plug upon removal of the latter for use in dislodging said valve seat plug from said bore by manipulation of said adjustable member.

3. A valve assembly for use on high pressure fluid lines, comprising a body having a flow passage extending from an inlet and to an opposite aligned outlet end thereof, said body having a bore extending laterally and entirely therethrough and interrupting said passage, said bore being inwardly tapered from one side thereof, a valve seat comprising a tapered plug removably mounted in the tapered portion of said bore, said plug having a passage extending therethrough at least as large as and adapted to be aligned with the passage through said body, packing rings on the outer tapered surface of said plug at opposite sides thereof adapted to form seals completely surrounding the opposite ends of said passage when said plug is positioned in said body, means for sealing said plug in said bore, said means having an adjustable member for applying pressure to said plug to lodge it in said bore, said plug having an opening extending therethrough laterally of and across its passage providing opposite valve seats in its passage, a valve member mounted for lateral movement across said seats to close and open said passage, and means extending into said bore from the opposite side thereof for actuating said valve member, said valve member comprising separate sections presented toward opposite ends of said passage, and said actuating means including an element which engages said opposite sections when said valve member is in position to close said passage to expand said sections outwardly with respect to one another respectively against said opposite valve seats.

4. A valve assembly for use on high pressure fluid lines, comprising a body having a flow passage extending from an inlet end to an opposite aligned outlet end thereof, said body having a bore extending laterally therethrough and interrupting said passage, said bore being inwardly tapered from one side thereof, a valve seat assembly comprising a tapered plug removably mounted in the tapered portion of said bore, said plug having a passage extending therethrough as large as and adapted to be aligned with the passage through said body, packing rings positioned between the outer tapered surface of said plug and the surrounding wall of said bore adapted to form seals completely surrounding the opposite ends of said passage when said plug is positioned in said body, means for sealing said plug in said bore, said means having an adjustable member for applying pressure to said plug to lodge it in said bore, said plug having an opening extending therethrough laterally of and across its passage providing opposite valve seats in its passage, a valve member mounted for lateral movement across said seats to close and open said passage, said valve member comprising separate sections presented respectively toward opposite ends of said passage, a carrier connected with one end of said valve member for moving the latter across said passage, said carrier being provided with means for expanding the opposite sections of said valve member adjacent one end thereof when the valve member is in its closed position, and a fixed expanding element carried by said plug for engaging and expanding the opposite sections of said valve member at the opposite end thereof when said valve member is moved to its closed position by said carrier, said expanding element being positioned entirely outside of said passage when said valve member is moved to its open position to permit insertion of tools requiring the full diameter of said passage.

5. A valve assembly for use on high pressure fluid lines, comprising a body having a flow passage extending from an inlet end to an opposite aligned outlet end thereof, said body having a bore extending laterally and entirely therethrough and interrupting said passage, said bore being inwardly tapered from one side of said body to a point beyond said passage and thence flaring outwardly at its other end on the opposite side of said body, a valve seat comprising a tapered plug removably mounted in the tapered portion of said bore, said valve seat plug having a passage extending therethrough as large as and adapted to be aligned with the passage through said body, a first sealing plug in one end of said bore for removably securing said valve seat plug therein and having an adjustable member for applying pressure to said valve seat plug to lodge it in said bore, said valve seat plug having an opening extending therethrough laterally of and across its passage providing opposite valve seats in its passage, a valve member mounted for lateral movement across said seats to close and open said passage, a second sealing plug fixed in the flaring end of said bore opposite to that through which said valve seat plug is inserted, and means carried by said second sealing plug engaging said valve member and operable to move the same across said passage, said assembly being constructed to provide for full retraction of said valve member from said passage to permit insertion of tools therethrough requiring the full diameter of said passage.

6. A valve assembly for use on high pressure fluid lines comprising a body having a straight flow passage extending therethrough between its upstream and downstream ends, said body having a bore extending laterally therethrough, said bore tapering inwardly from one side of said body to a point beyond said passage and thence flaring outwardly toward the opposite side of said body, a removable tapered valve seat plug in that portion of said bore which crosses said passage, said plug having a passage extending therethrough as large as and adapted to be aligned with the passage through said body, a first tapered sealing plug secured in the outer part of said bore at said one side of said body having adjustable means for holding said valve seat plug in proper position in said bore, a second tapered sealing plug secured in the outer part of said bore at said opposite side of said body, a valve member mounted for lateral movement in said valve seat plug across said plug passage, actuating means for said valve member carried by said second sealing plug, said valve member comprising separate parts mounted to yield with respect to one another toward opposite ends of said plug passage to seal the latter, a movable wedge carried by said actuating means positioned to engage the opposite parts of said valve member adjacent the rearward end thereof to expand said rearward end when said valve member is in closed position, and a fixed expanding wedge on said first sealing plug located entirely outside of said plug passage and positioned to engage the opposite parts of said valve member adjacent the forward end thereof to expand said forward end when said valve member is in its closed position.

ROBERT A. MUELLER.
ROBERT L. CRAIN.

References Cited in the file of this patent

UNITED STATES PATENTS

| Number | Name | Date |
|---|---|---|
| 239,293 | Bergreen | Mar. 22, 1881 |
| 302,209 | Paget | July 15, 1884 |
| 650,989 | Ranoe | June 5, 1900 |
| 785,854 | Cadman | Mar. 28, 1905 |
| 890,609 | Coleman | June 16, 1908 |
| 1,498,018 | Cronkhite et al. | June 17, 1924 |
| 1,578,349 | Nixon | Mar. 30, 1926 |
| 1,689,296 | Redding | Oct. 30, 1928 |
| 1,697,608 | Patterson | Jan. 1, 1929 |
| 1,805,710 | Wilkins | May 19, 1931 |
| 1,947,409 | Elten | Feb. 13, 1934 |
| 1,981,279 | Mueller | Nov. 20, 1934 |
| 2,148,327 | Smith et al. | Feb. 21, 1939 |
| 2,241,288 | Yancey | May 6, 1941 |
| 2,370,397 | Ellinwood | Feb. 27, 1945 |

FOREIGN PATENTS

| Number | Country | Date |
|---|---|---|
| 3,238 | Great Britain | of 1888 |
| 259,337 | Great Britain | Oct. 14, 1926 |
| 503,657 | Germany | July 24, 1930 |